US011048509B2

(12) United States Patent
Parandeh Afshar et al.

(10) Patent No.: US 11,048,509 B2
(45) Date of Patent: Jun. 29, 2021

(54) PROVIDING MULTI-ELEMENT MULTI-VECTOR (MEMV) REGISTER FILE ACCESS IN VECTOR-PROCESSOR-BASED DEVICES

(71) Applicant: QUALCOMM Incorporated, San Diego, CA (US)

(72) Inventors: Hadi Parandeh Afshar, San Diego, CA (US); Amrit Panda, Redmond, WA (US); Eric Rotenberg, Raleigh, NC (US); Gregory Michael Wright, Chapel Hill, NC (US)

(73) Assignee: Qualcomm Incorporated

( * ) Notice: Subject to any disclaimer, the term of this patent is extended or adjusted under 35 U.S.C. 154(b) by 150 days.

(21) Appl. No.: 16/000,580

(22) Filed: Jun. 5, 2018

(65) Prior Publication Data

US 2019/0369994 A1 Dec. 5, 2019

(51) Int. Cl.
*G06F 9/30* (2018.01)
*G06F 15/78* (2006.01)
*G06F 15/80* (2006.01)

(52) U.S. Cl.
CPC ...... *G06F 9/30036* (2013.01); *G06F 9/30105* (2013.01); *G06F 15/78* (2013.01); *G06F 15/8084* (2013.01)

(58) Field of Classification Search
None
See application file for complete search history.

(56) References Cited

U.S. PATENT DOCUMENTS 5,323,489 A * 6/1994 Bird .................. G06F 9/38
711/157
2014/0115227 A1* 4/2014 Ingle .................. G06F 9/30043
711/5
(Continued)

FOREIGN PATENT DOCUMENTS

GB 2540940 A 2/2017
WO 0073897 A1 12/2000
(Continued)

OTHER PUBLICATIONS

International Search Report and Written Opinion for PCT/US2019/035216, dated Sep. 27, 2019, 13 pages.

*Primary Examiner* — Corey S Faherty
(74) *Attorney, Agent, or Firm* — Edward Meisarosh

(57) ABSTRACT

Providing multi-element multi-vector (MEMV) register file access in vector-processor-based devices is disclosed. In this regard, a vector-processor-based device includes a vector processor comprising multiple processing elements (PEs) communicatively coupled via a corresponding plurality of channels to a vector register file comprising a plurality of memory banks. The vector processor provides a direct memory access (DMA) controller that is configured to receive a plurality of vectors that each comprise a plurality of vector elements representing operands for processing a loop iteration. The DMA controller arranges the vectors in the vector register file such that, for each group of vectors to be accessed in parallel, vector elements for each vector are stored consecutively, but corresponding vector elements of consecutive vectors are stored in different memory banks of the vector register file. As a result, multiple elements of multiple vectors may be accessed with a single vector register file access operation.

24 Claims, 8 Drawing Sheets

(56) References Cited

U.S. PATENT DOCUMENTS

| | | |
|---|---|---|
| 2015/0089192 A1 | 3/2015 | Gonion |
| 2015/0309800 A1 | 10/2015 | Chen et al. |
| 2015/0378734 A1 | 12/2015 | Hansen et al. |
| 2016/0253179 A1 | 9/2016 | Gonion |

FOREIGN PATENT DOCUMENTS

| | | |
|---|---|---|
| WO | 2016195921 A1 | 12/2016 |
| WO | 2017021676 A1 | 2/2017 |

* cited by examiner

PROVIDING MULTI-ELEMENT MULTI-VECTOR (MEMV) REGISTER FILE ACCESS IN VECTOR-PROCESSOR-BASED DEVICES

BACKGROUND

I. Field of the Disclosure

The technology of the disclosure relates generally to vector-processor-based devices, and, in particular, to improving vector register file bandwidth utilization by vector-processor-based devices.

II. Background

Vector-processor-based devices are computing devices that employ vector processors capable of operating on one-dimensional arrays of data ("vectors") using a single program instruction. Conventional vector processors include multiple processing elements (PEs) (such as in-order processing units or coarse-grained reconfigurable arrays (CGRAs), as non-limiting examples) that are organized into vector lanes. Vector processors made up of in-order processing units are generally less complex to implement, but may require additional logic within each PE for operations such as fetching and decoding instructions. In contrast, vector processors that employ CGRAs may be more complex to implement, but may reduce overhead through sharing of logic for fetching and decoding instructions among all of the PEs. Additionally, reconfigurable vector processors may enable configuration overhead to be amortized by configuring constituent PEs one time, and then executing instructions using the PEs multiple times using multiple sets of input data before reconfiguring the PEs again.

Vector-processor-based devices are particularly useful for processing loops that involve a high degree of data level parallelism and no loop-carried dependence. When processing such a loop, each PE of the vector processor performs the same task (e.g., executing different loop iterations of the loop) in parallel. In particular, the functional units constituting each PE execute in parallel on different operands read from a vector, with corresponding functional units of different PEs operating on different elements of the same vector.

When processing loops using conventional vector-processor-based devices, one vector is read from and written to a vector register file at a time. As a result, several separate vector register file accesses may be required to obtain all operands required for all functional units within the PEs of the vector processor. However, if the number of PEs is smaller than the number of vector elements and/or smaller than the number of loop iterations to be processed, each vector register file access will include vector elements that are unneeded and thus represent a waste of bandwidth. Moreover, if the required computational precision is lower than the width of each channel through which each PE accesses the vector register file (e.g., the computational precision is 32 bits, while the width of each channel is 64 bits), additional bandwidth may be wasted by each vector register file access. Accordingly, it is desirable to provide a mechanism to improve utilization of bandwidth for accessing the vector register file.

SUMMARY OF THE DISCLOSURE

Aspects disclosed in the detailed description include providing multi-element multi-vector (MEMV) register file access in vector-processor-based devices. In this regard, a vector-processor-based device includes a vector processor comprising a plurality of processing elements (PEs) that are communicatively coupled to a vector register file via a corresponding plurality of channels. The vector register file comprises a plurality of memory banks, and in some aspects may comprise a scratchpad memory as a non-limiting example. To better utilize the available bandwidth to the vector register file provided by the plurality of channels when processing a loop, the vector processor is configured to enable MEMV access operations on the vector register file by arranging vector elements (representing operands for each loop iteration) based on how the loop is mapped to the plurality of PEs. In particular, the vector processor provides a direct memory access (DMA) controller that is configured to receive a plurality of vectors that each comprise a plurality of vector elements representing operands for processing a loop iteration. The DMA controller then arranges the vectors in the vector register file in such a manner that, for each group of vectors to be accessed in parallel, vector elements for each vector are stored consecutively, but corresponding vector elements of each pair of vectors within the group of vectors are stored in different memory banks of the vector register file. As a result, multiple elements of multiple vectors may be read with a single vector register file access operation, which enables full utilization of the available bandwidth for accessing the vector register file.

In some aspects, the number of PEs that are operating in parallel may determine how many vector elements within each vector are read in parallel, while the number of vectors that are read in parallel may be determined based on the ratio of total bandwidth to the vector register file, and a product of the number of PEs and the required computational precision. Some aspects may provide that the arrangement of each vector within the vector register file is determined by the DMA controller based on a programmable placement table that stores, for each loop, a loop identifier, a number of PEs, and a computational precision indicator.

In another aspect, a vector-processor-based device for providing MEMV register file access is provided. The vector-processor-based device comprises a plurality of PEs, and a vector register file that comprises a plurality of memory banks and is communicatively coupled to the plurality of PEs via a corresponding plurality of channels. The vector-processor-based device also comprises a DMA controller that is configured to receive a plurality of vectors, each comprising a plurality of vector elements. The DMA controller is further configured to write the plurality of vectors into the vector register file such that, for each group of vectors of the plurality of vectors to be accessed in parallel, corresponding vector elements of consecutive vectors of the group of vectors are stored in different memory banks of the plurality of memory banks of the vector register file.

In another aspect, a vector-processor-based device for handling branch divergence in loops is provided. The vector-processor-based device comprises a means for receiving a plurality of vectors, each comprising a plurality of vector elements. The vector-processor-based device further comprises a means for writing the plurality of vectors into a vector register file comprising a plurality of memory banks and communicatively coupled to a plurality of PEs via a corresponding plurality of channels, such that, for each group of vectors of the plurality of vectors to be accessed in parallel, corresponding vector elements of consecutive vectors of the group of vectors are stored in different memory banks of the plurality of memory banks of the vector register file.

In another aspect, a method for providing MEMV register file access is provided. The method comprises receiving, by a DMA controller of a vector-processor-based device, a plurality of vectors, each comprising a plurality of vector elements. The method further comprises writing the plurality of vectors into a vector register file comprising a plurality of memory banks and communicatively coupled to a plurality of PEs via a corresponding plurality of channels, such that, for each group of vectors of the plurality of vectors to be accessed in parallel, corresponding vector elements of consecutive vectors of the group of vectors are stored in different memory banks of the plurality of memory banks of the vector register file.

In another aspect, a non-transitory computer-readable medium is provided, having stored thereon computer-executable instructions for causing a vector processor of a vector-processor-based device to receive a plurality of vectors, each comprising a plurality of vector elements. The computer-executable instructions further cause the vector processor to write the plurality of vectors into a vector register file comprising a plurality of memory banks and communicatively coupled to a plurality of PEs via a corresponding plurality of channels, such that, for each group of vectors of the plurality of vectors to be accessed in parallel, corresponding vector elements of consecutive vectors of the group of vectors are stored in different memory banks of the plurality of memory banks of the vector register file.

BRIEF DESCRIPTION OF THE FIGURES

FIGS. 3A and 3B are block diagrams illustrating exemplary data placement within the vector register file of FIG. 1 to enable MEMV access, based on a number of processing elements (PEs) and a number of PEs to be used for parallel processing of a loop;

DETAILED DESCRIPTION

Figure 1:
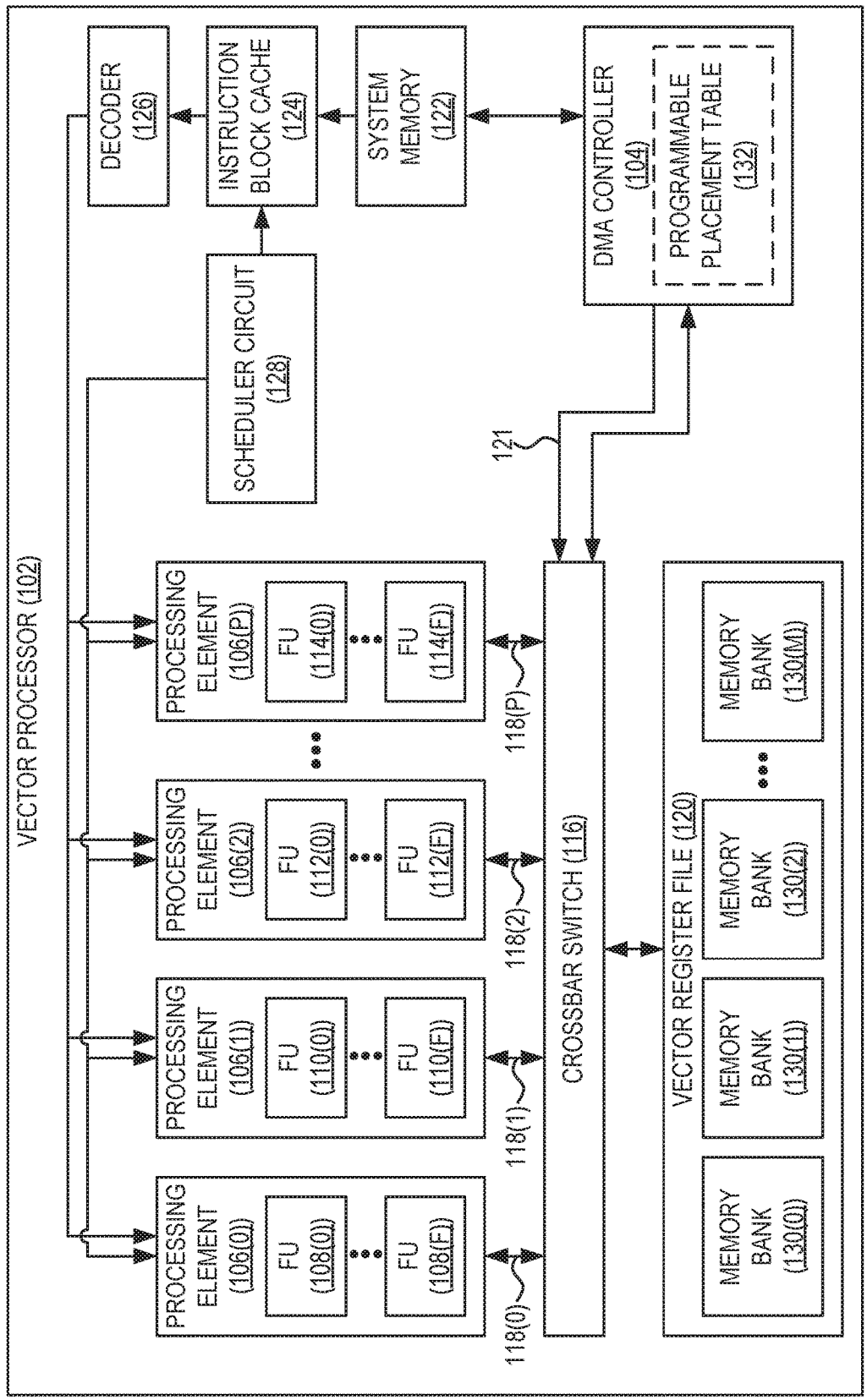
FIG. 1 is a block diagram illustrating a vector-processor-based device configured to provide multi-element multi-vector (MEMV) register file access.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing multi-element multi-vector (MEMV) register file access in vector-processor-based devices. In this regard, FIG. 1 illustrates a vector-processor-based device 100 that implements a block-based dataflow instruction set architecture (ISA), and that provides a vector processor 102 comprising a direct memory access (DMA) controller 104. The vector processor 102 includes a plurality of processing elements (PEs) 106(0)-106(P), each of which may comprise a processor having one or more processor cores, or an individual processor core comprising a logical execution unit and associated caches and functional units, as non-limiting examples. In the example of FIG. 1, each of the PEs 106(0)-106(P) comprises a plurality of functional units ("FU") 108(0)-108(F), 110(0)-110(F), 112(0)-112(F), 114(0)-114(F). In some aspects, the PEs 106(0)-106(P) may be reconfigurable, such that each of the PEs 106(0)-106(P) may represent a fused PE comprising two or more constituent PEs (not shown) configured to operate as a singular unit. It is to be understood that the vector-processor-based device 100 may include more or fewer vector processors than the vector processor 102 illustrated in FIG. 1, and/or may provide more or fewer PEs (each having more or fewer functional units) than the PEs 106(0)-106(P) than illustrated in FIG. 1.

In the example of FIG. 1, the PEs 106(0)-106(P) are each communicatively coupled bidirectionally to a crossbar switch 116 via channels 118(0)-118(P), through which data (e.g., results of executing a loop iteration of a loop) may be read from and written to a vector register file 120. The crossbar switch 116 in the example of FIG. 1 is communicatively coupled to the DMA controller 104, which is configured to perform memory access operations to read data from and write data to a system memory 122. The DMA controller 104 of FIG. 1 further employs a control path 121 to configure the crossbar switch 116 to control the exchange of data between the vector register file 120, the system memory 122, and the PEs 106(0)-106(P), and to arrange, store, and retrieve vectors and vector elements in the vector register file 120. The system memory 122 according to some aspects may comprise a double-data-rate (DDR) memory, as a non-limiting example. In exemplary operation, instruction blocks (not shown) are fetched from the system memory 122, and may be cached in an instruction block cache 124 to reduce the memory access latency associated with fetching frequently accessed instruction blocks. The instruction blocks are decoded by a decoder 126, and decoded instructions are assigned to a PE of the PEs 106(0)-106(P) by a scheduler circuit 128 for execution. To facilitate execution, the PEs 106(0)-106(P) may receive live-in data values from the vector register file 120 as input, and, following execution of instructions, may write live-out data values as output to the vector register file 120.

It is to be understood that the vector-processor-based device 100 of FIG. 1 may include more or fewer elements than illustrated in FIG. 1. The vector-processor-based device 100 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

One application for which the vector-processor-based device 100 may be well-suited is processing loops, which involves mapping each iteration of the loop to a different PE of the plurality of PEs 106(0)-106(P), and then executing multiple loop iterations in parallel. However, as noted above, conventional vector-processor-based devices may face challenges in maximizing the utilization of bandwidth provided by the channels 118(0)-118(P) to the vector register file 120. For example, if a number of the plurality of PEs 106(0)-106(P) is smaller than a number of vector elements and/or a number of loop iterations to be processed, then each access to the vector register file 120 will include vector elements that are not needed, and thus represent a waste of bandwidth. Similarly, if the required computational precision is lower than the width of each channel 118(0)-118(P) through which each PE 106(0)-106(P) accesses the vector register file 120 (e.g., the computational precision is 32 bits, while the width of each channel is 64 bits), additional bandwidth may be wasted by each access to the vector register file 120.

In this regard, the DMA controller 104 and the vector register file 120 of FIG. 1 are configured to provide MEMV register file access when accessing the vector register file 120. As seen in FIG. 1, the vector register file 120 comprises a multi-bank scratchpad memory that provides a plurality of memory banks 130(0)-130(M) through which parallel access operations may be performed on the vector register file 120. The DMA controller 104 of FIG. 1 is configured to enable MEMV access operations on the vector register file 120 by arranging vector elements of vectors stored in the vector register file 120 such that, for each group of vectors to be accessed in parallel, vector elements for each vector are stored consecutively, but corresponding vector elements of each pair of vectors within the group of vectors are stored in different memory banks 130(0)-130(M) of the vector register file 120. As a result, multiple elements of multiple vectors may be read with a single vector register file access operation on the vector register file 120 by the DMA controller 104, thus allowing full use of the available bandwidth for accessing the vector register file 120. Exemplary arrangements of vectors and vector elements within the memory banks 130(0)-130(M) of the vector register file 120 are discussed in greater detail below with respect to FIGS. 2 and 3A-3B.

In exemplary operation, the DMA controller 104 determines how to store vectors representing operands for each loop iteration of a loop within the plurality of memory banks 130(0)-130(M) of the vector register file 120 based on how the loop is mapped to the plurality of PEs 106(0)-106(P). In some aspects, for example, the DMA controller 104 may employ mapping data generated by a compiler for the vector-processor-based device 100, as a non-limiting example. After the DMA controller 104 retrieves operand data (e.g., from the system memory 122) for a given set of loop iterations and arranges the operand data as vectors within the vector register file 120, the DMA controller 104 reads multiple vector elements of multiple vectors from the vector register file 120 (e.g., via the crossbar switch 116, according to some aspects), and provides the vector elements to the plurality of PEs 106(0)-106(P) for processing of the loop. Some aspects of the vector-processor-based device 100 further provide that the crossbar switch 116 is also configured to receive execution results from the plurality of PEs 106(0)-106(P), and write the execution results to the vector register file 120 using an MEMV access operation.

In some aspects, the DMA controller 104 provides a programmable placement table 132 that stores data used by the DMA controller 104 in determining how to arrange vector elements to be stored within the vector register file 120, as well as how to read vector elements from the vector register file 120. As discussed in greater detail below with respect to FIG. 4, the programmable placement table 132 may provide a plurality of placement table entries. Each placement table entry of the programmable placement table 132 may correspond to a loop to be processed by the plurality of PEs 106(0)-106(P), and may store data relating to the number of PEs 106(0)-106(P) to be employed and the computational precision required for processing loop iterations.

Figure 2:
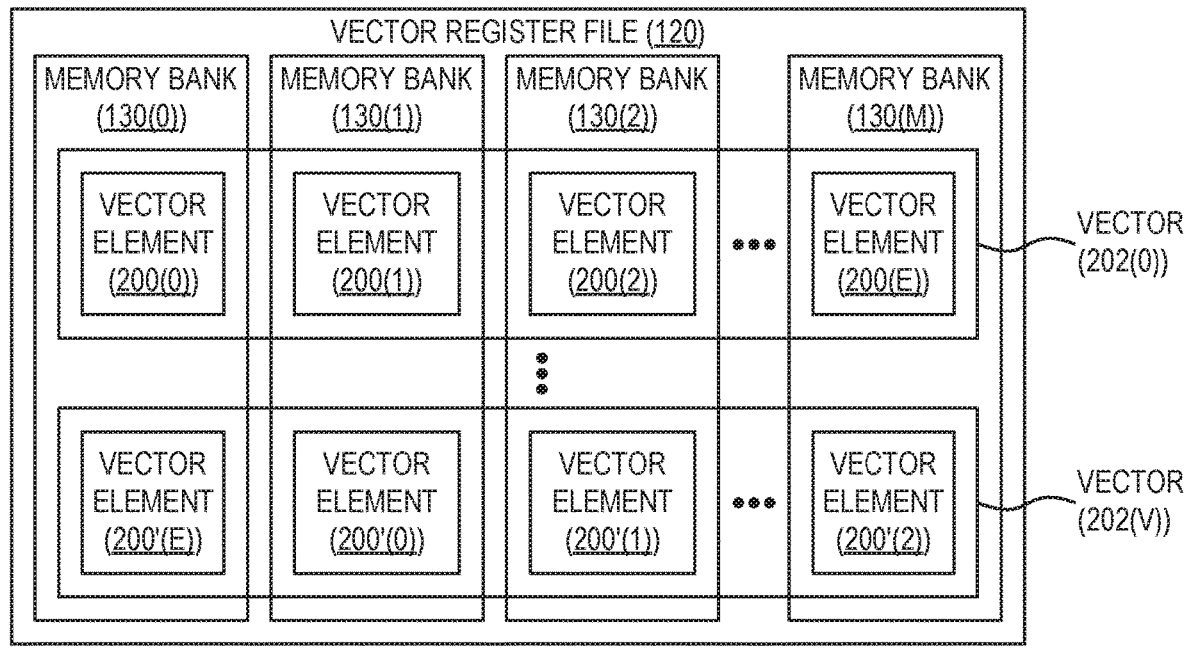
FIG. 2 is a block diagram illustrating how the vector-processor-based device of FIG. 1 may map data used for parallel processing of loop iterations of a loop into multiple vectors within the vector register file of FIG. 1.

To illustrate the internal structure of the vector register file 120 of FIG. 1 according to some aspects, FIG. 2 is provided. As seen in FIG. 2, the vector register file 120 provides the plurality of memory banks 130(0)-130(M) to store a plurality of vector elements 200(0)-200(E), 200'(0)-200'(E) of a plurality of vectors 202(0)-202(V). In the example of FIG. 2, each of the memory banks 130(0)-130(M) stores one vector element 200(0)-200(E), 200'(0)-200'(E) of the vectors 202(0)-202(V). To facilitate MEMV access operations on the vector register file 120, the vector elements 200(0)-200(E) of the first vector 202(0) are left-aligned within the vector register file 120 such that the first vector element 200(0) of the vector 202(0) is stored in the first memory bank 130(0). The vector elements 200'(0)-200'(E) of the subsequent vector 202(V) are then offset relative to the first vector 202(0) such that the first vector element 200'(0) of the vector 202(V) is stored in the second memory bank 130(1), with the last vector element 200'(E) "wrapping around" to be stored in the first memory bank 130(0). Because the corresponding vector elements 200(0), 200'(0) of the consecutive vectors 202(0), 202(V) are stored in different memory banks 130(0), 130(1) of the vector register file 120, the vector elements 200(0), 200'(0) can be read simultaneously from the vector register file 120 by the DMA controller 104 of FIG. 1.

In some aspects, the maximum number of vectors 202(0)-202(V) to be accessed in parallel and the particular arrangement of vector elements 200(0)-200(E), 200'(0)-200'(E) for those vectors 202(0)-202(V) within the vector register file 120 may be determined by the DMA controller 104 based on a number of factors. These factors may include the number of PEs 106(0)-106(P) to be used for parallel processing of a loop, the number of loop iterations to be processed, the number of functional units 108(0)-108(F), 110(0)-110(F), 112(0)-112(F), 114(0)-114(F) constituting the PEs 106(0)-106(P), the bandwidth provided by the channels 118(0)-118(P) to the vector register file 120, and/or the computational precision required for processing the loop. For instance, the DMA controller 104 may determine how many vectors within the plurality of vectors 202(0)-202(V) can be accessed in parallel during loop processing based on a ratio of the total bandwidth provided by the channels 118(0)-118(P) of FIG. 1, and a product of the total number of PEs of the plurality of PEs 106(0)-106(P) and a computational precision. As an example, assume that the vector-processor-based device 100 of FIG. 1 provides eight (8) PEs 106(0)-106(7) (e.g., individual standalone PEs or fused PEs), and also provides 16 channels 118(0)-118(15) each having a width of 64 bits. Additionally, assume that the computational precision required for processing the loop iterations is 32 bits. Based on these assumptions, the DMA controller 104 may calculate that the maximum number of vectors that can be accessed in parallel is (16×64)/(8×32), which equals four (4) vectors of the plurality of vectors 202(0)-202(V).

In addition to determining how many vectors 202(0)-202(V) can be accessed in parallel, the DMA controller 104 may also determine how to offset the vector elements 200(0)-200(E), 200'(0)-200'(E) of successive vectors 202(0)-202(V) to allow multiple vector elements 200(0)-200(E), 200'(0)-200'(E) of multiple vectors 202(0)-202(V) to be accessed in parallel. In some aspects, each operand required for processing a single loop iteration is stored in a corresponding vector element 200(0)-200(E), 200'(0)-200'(E) of successive ones of the vectors 202(0)-202(V). For example, if each loop iteration requires three (3) operands, the operands for a first loop iteration may correspond to a first vector element of three (3) successive vectors, the operands for a second loop iteration may correspond to a second vector element of the three (3) successive vectors, and so on. To permit all operands for each loop iteration to be read in parallel, each group of three (3) vectors of the plurality of vectors 202(0)-202(V) to be read in parallel must be offset by the number of PEs 106(0)-106(P) that will be receiving the operands. Consequently, when arranging the vectors 202(0)-202(V) in the vector register file 120, the DMA controller 104 may left-align a first vector 202(0) within the vector register file 120 so that the first vector element 200(0) is stored within the first memory bank 130(0). For each subsequent vector 202(1)-202(V) within the group of vectors 202(0)-202(V) to be accessed in parallel, the DMA controller 104 may then offset the vector elements 200(0)-200(E), 200'(0)-200'(E) by a number of memory banks 130(0)-130(M) equal to a number of the PEs 106(0)-106(P) receiving the operands.

Figure 3A:
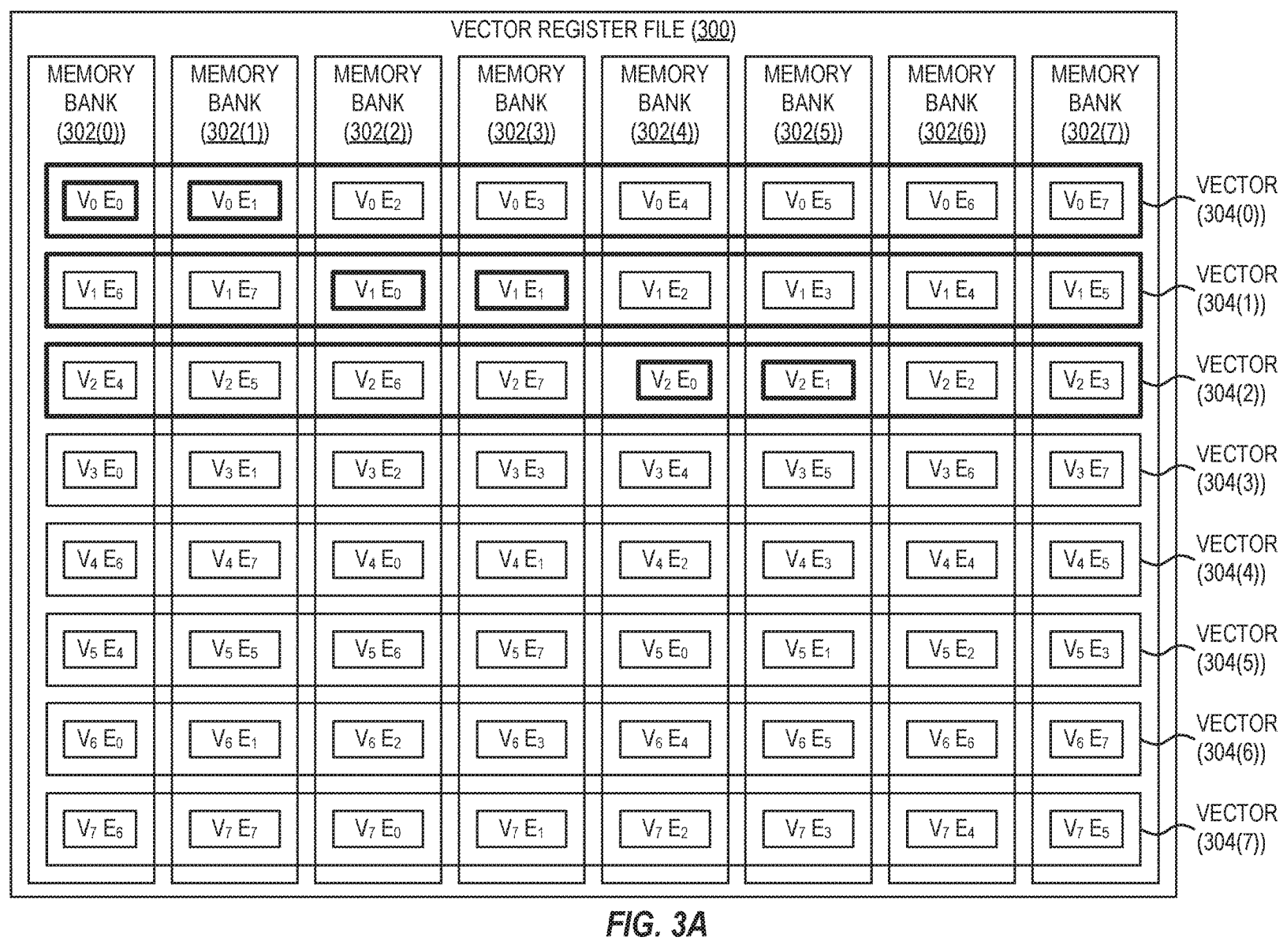
Figure 3B:
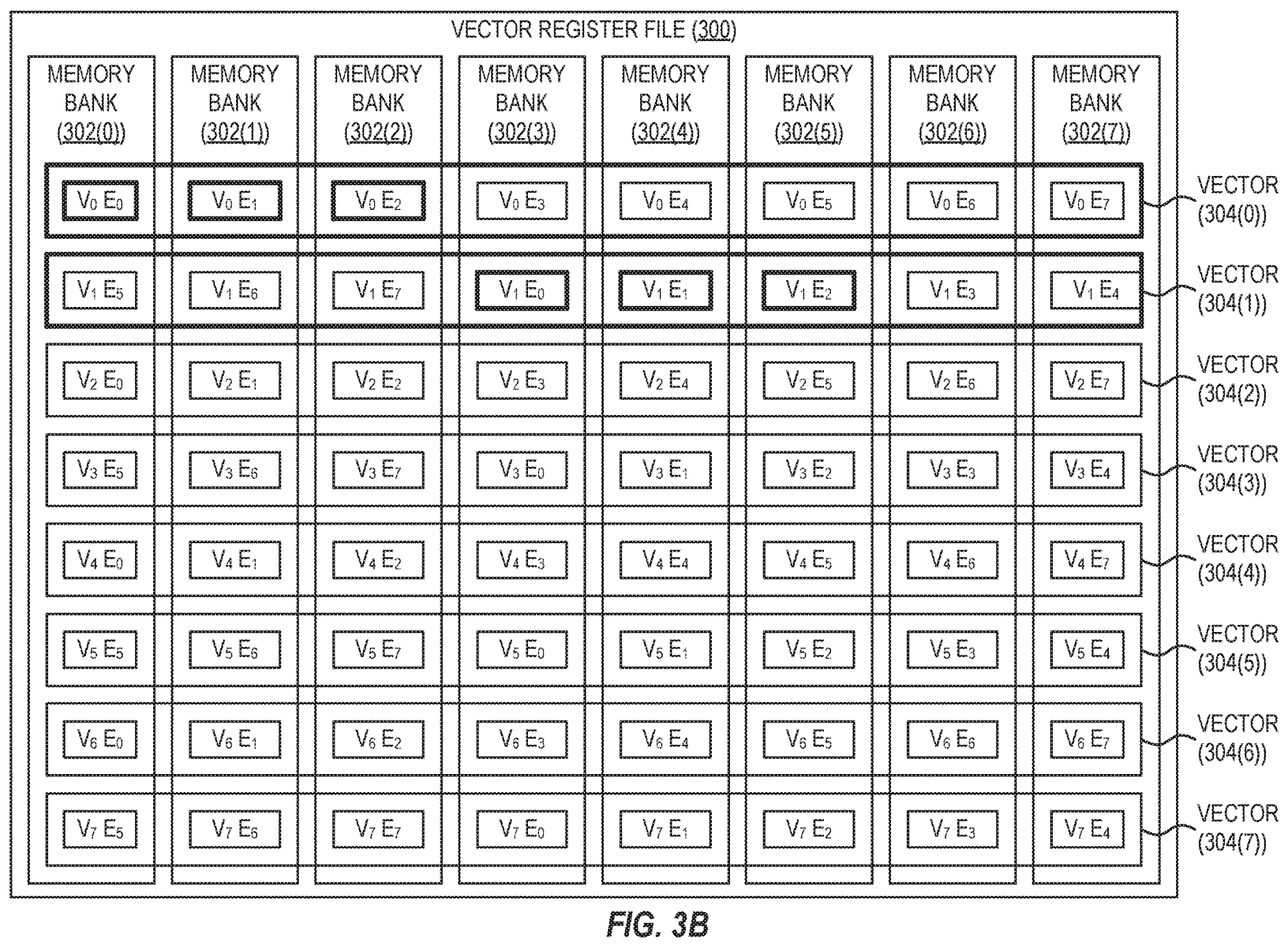

FIGS. 3A and 3B illustrate in greater detail exemplary arrangements of vector elements within a vector register file such as the vector register file 120 of FIG. 1 to enable MEMV access. In FIG. 3A, a vector register file 300, corresponding in functionality to the vector register file 120 of FIG. 1, provides multiple memory banks 302(0)-302(7) corresponding to the memory banks 130(0)-130(M) of FIG. 1. The memory banks 302(0)-302(7) are used to store a plurality of vectors 304(0)-304(7) (also referred to as "$V_0$-$V_7$"), with each of the vectors 304(0)-304(7) including eight (8) vector elements referenced as "$E_0$-$E_7$." It is assumed for the example in FIG. 3A that a DMA controller such as the DMA controller 104 of FIG. 1 has calculated that two (2) vector elements within each group of three (3) of the vectors 304(0)-304(7) are to be accessed in parallel (based on, e.g., two (2) of the PEs 106(0)-106(P) processing three (3) operands each). Accordingly, for the group of three (3) vectors 304(0)-304(2), the DMA controller 104 left-aligns the first vector 304(0) such that the vector element $V_0$ $E_0$ is stored in the memory bank 302(0), the vector element $V_0$ $E_1$ is stored in the memory bank 302(1), and so forth. The subsequent vector 304(1) is then offset such that the vector element $V_1$ $E_0$ is stored in the memory bank 302(2), the vector element $V_1$ $E_1$ is stored in the memory bank 302(3), and so on, with the last two (2) vector elements $V_1$ $E_6$ and $V_1$ $E_7$ "wrapping around" to be stored in the memory banks 302(0) and 302(1). Likewise, the subsequent vector 304(2) is offset such that the vector element $V_2$ $E_0$ is stored in the memory bank 302(4), the vector element $V_2$ $E_1$ is stored in the memory bank 302(5), and so on. The pattern then resets with the next group of three (3) vectors 304(3)-304(5) and the final group of vectors 304(6)-304(7).

FIG. 3B illustrates a similar data arrangement in which a DMA controller such as the DMA controller 104 of FIG. 1 has calculated that three (3) vector elements within each group of two (2) of the vectors 304(0)-304(7) are to be accessed in parallel (based on, e.g., three (3) of the PEs 106(0)-106(P) processing two (2) operands each). Accordingly, for the group of two (2) vectors 304(0)-304(1), the DMA controller 104 left-aligns the first vector 304(0) such that the vector element $V_0$ $E_0$ is stored in the memory bank 302(0), the vector element $V_0$ $E_1$ is stored in the memory bank 302(1), the vector element $V_0$ $E_2$ is stored in the memory bank 302(2), and so forth. The subsequent vector 304(1) is then offset such that the vector element $V_1$ $E_0$ is stored in the memory bank 302(3), the vector element $V_1$ $E_1$ is stored in the memory bank 302(4), the vector element $V_1$ $E_2$ is stored in the memory bank 302(5), and so on, with the last three (3) vector elements $V_1$ $E_5$, $V_1$ $E_6$, and $V_1$ $E_7$ "wrapping around" to be stored in the memory banks 302(0)-302(2). The pattern then resets with the following groups of two (2) vectors 304(2) and 304(3), 304(4) and 304(5), and 304(6) and 304(7).

Figure 4:
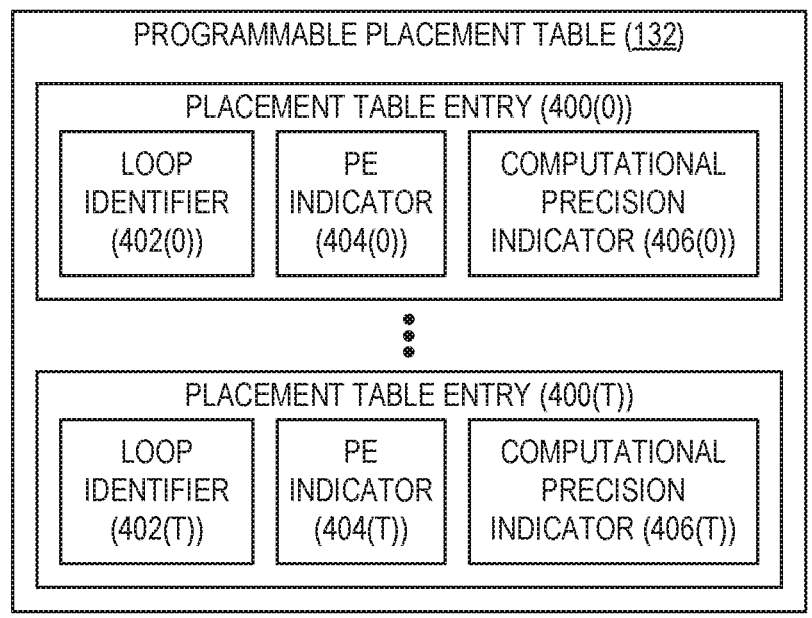
FIG. 4 is a block diagram illustrating an exemplary internal structure of a programmable placement table used by a direct memory access (DMA) controller in some aspects for determining data placement within the vector register file of FIG. 1.

As noted above, the DMA controller 104 of FIG. 1 may employ the programmable placement table 132 for determining data placement within the vector register file 120 of FIG. 1. In this regard, FIG. 4 illustrates an exemplary inner structure of the programmable placement table 132. As seen in FIG. 4, the programmable placement table 132 provides a plurality of placement table entries 400(0)-400(T). Each of the placement table entries 400(0)-400(T) includes a loop identifier 402(0)-402(T), a PE indicator 404(0)-404(T), and a computational precision indicator 406(0)-406(T). Each loop identifier 402(0)-402(T) corresponds to a loop to be processed by the vector-processor-based device 100 of FIG. 1, and may comprise a program counter or other unique identifier corresponding to the loop. Each PE indicator 404(0)-404(T) indicates a number of PEs 106(0)-106(P) that will be used in processing the corresponding loop, while each computational precision indicator 406(0)-406(T) indicates a computational precision to be employed when processing the corresponding loop. Using the data stored in the programmable placement table 132, the DMA controller 104 (and, in some aspects, the crossbar switch 116) may calculate an appropriate arrangement of data within the vector register file 120 to enable MEMV register file access, thus maximizing bandwidth usage.

Figure 5A:
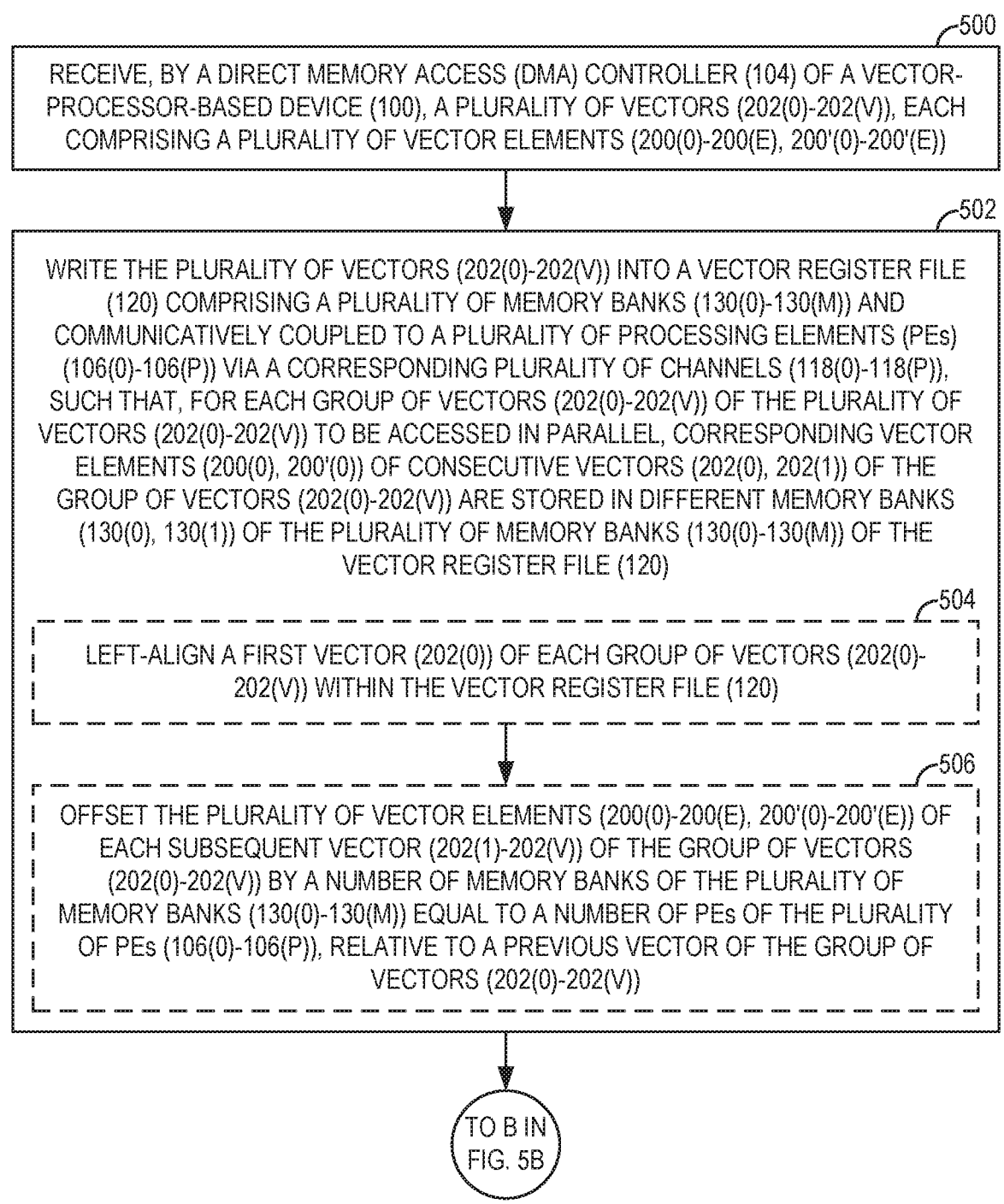
FIGS. 5A and 5B are flowcharts illustrating exemplary operations performed by the vector-processor-based device of FIG. 1 for providing MEMV register file access.
Figure 5B:
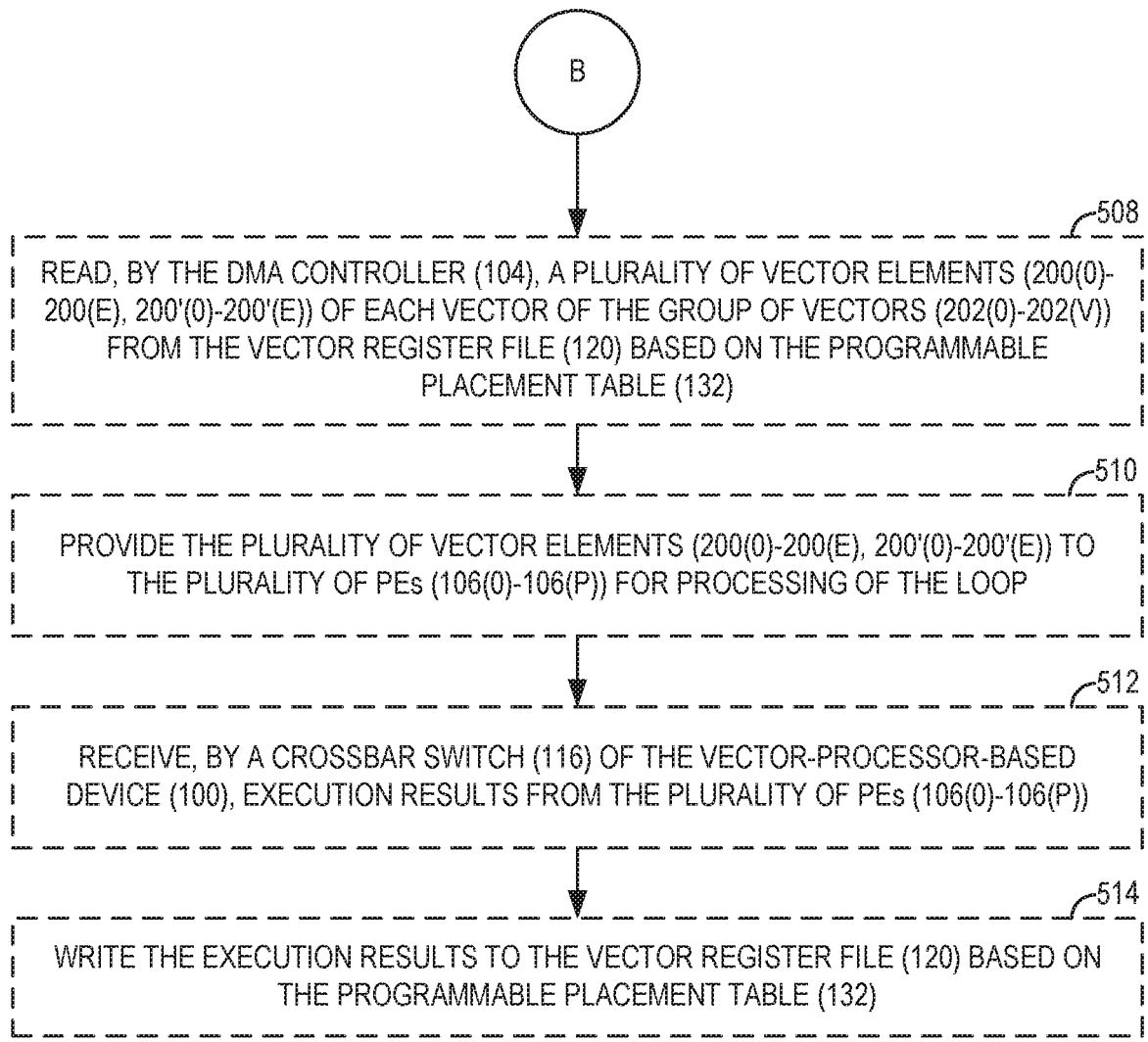

To illustrate exemplary operations for providing MEMV register file access in the vector-processor-based device 100 of FIG. 1, FIGS. 5A and 5B are provided. For the sake of clarity, elements of FIGS. 1-4 are referenced in describing FIGS. 5A and 5B. Operations begin in FIG. 5A with the DMA controller 104 receiving the plurality of vectors 202(0)-202(V), each comprising a plurality of vector elements 200(0)-200(E), 200'(0)-200'(E) (block 500). In this regard, the DMA controller 104 may be referred to herein as "a means for receiving a plurality of vectors, each comprising a plurality of vector elements." The DMA controller 104 then writes the plurality of vectors 202(0)-202(V) into the vector register file 120 comprising the plurality of memory banks 130(0)-130(M) and communicatively coupled to the plurality of PEs 106(0)-106(P) via the corresponding plurality of channels 118(0)-118(P), such that, for each group of vectors 202(0)-202(V) of the plurality of vectors 202(0)-202(V) to be accessed in parallel, corresponding vector elements 200(0), 200'(0) of consecutive vectors 202(0), 202(1) of the group of vectors 202(0)-202(V) are stored in different memory banks 130(0), 130(1) of the plurality of memory banks 130(0)-130(M) of the vector register file 120 (block 502). Accordingly, the DMA controller 104 may be referred to herein as "a means for writing the plurality of vectors into a vector register file comprising a plurality of memory banks and communicatively coupled to a plurality of processing elements (PEs) via a corresponding plurality of channels, such that, for each group of vectors of the plurality of vectors to be accessed in parallel, corresponding vector elements of consecutive vectors of the group of vectors are stored in different memory banks of the plurality of memory banks of the vector register file."

In some aspects, operations of block 502 for writing the plurality of vectors 202(0)-202(V) into the vector register file 120 may include the DMA controller 104 first left-aligning a first vector 202(0) of each group of vectors 202(0)-202(V) within the vector register file 120 (block 504). The DMA controller 104 may then offset the plurality of vector elements 200(0)-200(E), 200'(0)-200'(E) of each subsequent vector 202(1)-202(V) of the group of vectors 202(0)-202(V) by a number of memory banks of the plurality of memory banks 130(0)-130(M) equal to a number of PEs of the plurality of PEs 106(0)-106(P), relative to a previous vector of the group of vectors 202(0)-202(V) (block 506). Processing in some aspects then resumes at block 508 of FIG. 5B.

Referring now to FIG. 5B, the DMA controller 104 according to some aspects may read a plurality of vector elements 200(0)-200(E), 200'(0)-200'(E) of each vector of the group of vectors 202(0)-202(V) from the vector register file 120 based on the programmable placement table 132 (block 508). The DMA controller 104 may then provide the plurality of vector elements 200(0)-200(E), 200'(0)-200'(E) to the plurality of PEs 106(0)-106(P) for processing of a loop (block 510). Some aspects may further provide that the crossbar switch 116 may receive execution results from the plurality of PEs 106(0)-106(P) (block 512). The crossbar switch 116 may then write the execution results to the vector register file 120 based on the programmable placement table 132 (block 514).

Providing MEMV register file access in vector-processor-based devices according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 6:
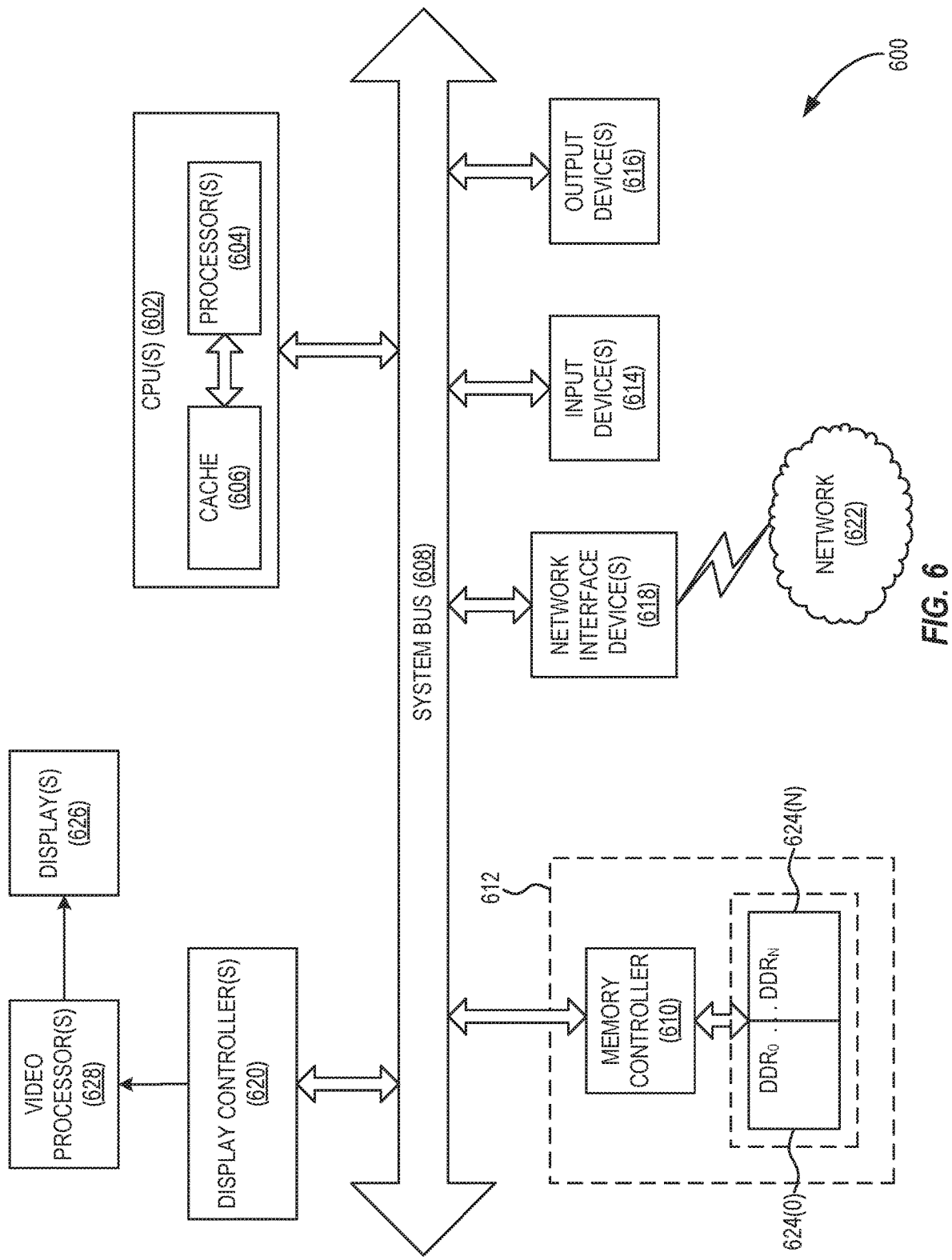
FIG. 6 is a block diagram of an exemplary processor-based system that can include the vector-processor-based device of FIG. 1.

In this regard, FIG. 6 illustrates an example of a processor-based system 600 that can include the PEs 106(0)-106(P) of FIG. 1. The processor-based system 600 includes one or more central processing units (CPUs) 602, each including one or more processors 604 (which in some aspects may correspond to the PEs 106(0)-106(P) of FIG. 1). The CPU(s) 602 may have cache memory 606 coupled to the processor(s) 604 for rapid access to temporarily stored data. The CPU(s) 602 is coupled to a system bus 608 and can intercouple master and slave devices included in the processor-based system 600. As is well known, the CPU(s) 602 communicates with these other devices by exchanging address, control, and data information over the system bus 608. For example, the CPU(s) 602 can communicate bus transaction requests to a memory controller 610 as an example of a slave device.

Other master and slave devices can be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including but not limited to input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include one or more memory units 624(0)-624(N).

The CPU(s) 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A vector-processor-based device for providing multi-element multi-vector (MEMV) register file access, comprising:
    a plurality of processing elements (PEs);
    a vector register file comprising a plurality of memory banks and communicatively coupled to the plurality of PEs via a corresponding plurality of channels; and
    a direct memory access (DMA) controller configured to:
        receive a plurality of vectors, each comprising a plurality of vector elements; and
        write the plurality of vectors into the vector register file such that, for each group of vectors of the plurality of vectors to be accessed in parallel, corresponding vector elements belonging to different vectors within the group of vectors are stored in different memory banks of the plurality of memory banks of the vector register file.

2. The vector-processor-based device of claim 1, wherein each PE of the plurality of PEs comprises a plurality of constituent PEs configured to function as a single fused PE.

3. The vector-processor-based device of claim 1, wherein the DMA controller is configured to write the plurality of vectors into the vector register file by being configured to:
    left-align a first vector of each group of vectors within the vector register file; and
    offset the plurality of vector elements of each subsequent vector of the group of vectors by a number of memory banks of the plurality of memory banks equal to a number of PEs of the plurality of PEs, relative to a previous vector of the group of vectors.

4. The vector-processor-based device of claim 1, wherein a size of each group of vectors of the plurality of vectors to be accessed in parallel is determined by a ratio of total bandwidth of the plurality of channels, and a product of a total number of PEs of the plurality of PEs and a computational precision.

5. The vector-processor-based device of claim 1, further comprising a programmable placement table comprising a plurality of placement table entries, wherein:
    each placement table entry of the plurality of placement table entries comprises a loop identifier representing a loop, a PE indicator representing a number of PEs for processing the loop, and a computational precision indicator for processing the loop; and
    the DMA controller is configured to write the plurality of vectors into the vector register file based on a placement table entry of the plurality of placement table entries of the programmable placement table corresponding to the loop.

6. The vector-processor-based device of claim 5, wherein the DMA controller is further configured to:
    read a plurality of vector elements of each vector of the group of vectors from the vector register file based on the programmable placement table; and
    provide the plurality of vector elements to the plurality of PEs for processing of the loop.

7. The vector-processor-based device of claim 5, further comprising a crossbar switch configured to:
    receive execution results from the plurality of PEs; and
    write the execution results to the vector register file based on the programmable placement table.

8. The vector-processor-based device of claim 1 integrated into an integrated circuit (IC).

9. The vector-processor-based device of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A vector-processor-based device for handling branch divergence in loops, comprising:
    a means for receiving a plurality of vectors, each comprising a plurality of vector elements; and
    a means for writing the plurality of vectors into a vector register file comprising a plurality of memory banks and communicatively coupled to a plurality of processing elements (PEs) via a corresponding plurality of channels, such that, for each group of vectors of the plurality of vectors to be accessed in parallel, corresponding vector elements belonging to different vectors within the group of vectors are stored in different memory banks of the plurality of memory banks of the vector register file.

11. A method for providing multi-element multi-vector (MEMV) register file access, comprising:
receiving, by a direct memory access (DMA) controller of a vector-processor-based device, a plurality of vectors, each comprising a plurality of vector elements; and
writing the plurality of vectors into a vector register file comprising a plurality of memory banks and communicatively coupled to a plurality of processing elements (PEs) via a corresponding plurality of channels, such that, for each group of vectors of the plurality of vectors to be accessed in parallel, corresponding vector elements belonging to different vectors within the group of vectors are stored in different memory banks of the plurality of memory banks of the vector register file.

12. The method of claim 11, wherein each PE of the plurality of PEs comprises a plurality of constituent PEs configured to function as a single fused PE.

13. The method of claim 11, wherein writing the plurality of vectors into the vector register file comprises:
left-aligning a first vector of each group of vectors within the vector register file; and
offsetting the plurality of vector elements of each subsequent vector of the group of vectors by a number of memory banks of the plurality of memory banks equal to a number of PEs of the plurality of PEs, relative to a previous vector of the group of vectors.

14. The method of claim 11, wherein a size of each group of vectors of the plurality of vectors to be accessed in parallel is determined by a ratio of total bandwidth of the plurality of channels, and a product of a total number of PEs of the plurality of PEs and a computational precision.

15. The method of claim 11, further comprising writing the plurality of vectors into the vector register file based on a placement table entry of a plurality of placement table entries of a programmable placement table corresponding to a loop;
wherein each placement table entry of the plurality of placement table entries comprises a loop identifier representing the loop, a PE indicator representing a number of PEs for processing the loop, and a computational precision indicator for processing the loop.

16. The method of claim 15, further comprising:
reading, by the DMA controller, a plurality of vector elements of each vector of the group of vectors from the vector register file based on the programmable placement table; and
providing the plurality of vector elements to the plurality of PEs for processing of the loop.

17. The method of claim 15, further comprising:
receiving, by a crossbar switch of the vector-processor-based device, execution results from the plurality of PEs; and
writing the execution results to the vector register file based on the programmable placement table.

18. A non-transitory computer-readable medium, having stored thereon computer-executable instructions for causing a vector processor of a vector-processor-based device to:
receive a plurality of vectors, each comprising a plurality of vector elements; and
write the plurality of vectors into a vector register file comprising a plurality of memory banks and communicatively coupled to a plurality of processing elements (PEs) via a corresponding plurality of channels, such that, for each group of vectors of the plurality of vectors to be accessed in parallel, corresponding vector elements belonging to different vectors within the group of vectors are stored in different memory banks of the plurality of memory banks of the vector register file.

19. The non-transitory computer-readable medium of claim 18, wherein each PE of the plurality of PEs comprises a plurality of constituent PEs configured to function as a single fused PE.

20. The non-transitory computer-readable medium of claim 18, wherein the computer-executable instructions for causing the vector processor to write the plurality of vectors into the vector register file comprise computer-executable instructions for causing the vector processor to:
left-align a first vector of each group of vectors within the vector register file; and
offset the plurality of vector elements of each subsequent vector of the group of vectors by a number of memory banks of the plurality of memory banks equal to a number of PEs of the plurality of PEs, relative to a previous vector of the group of vectors.

21. The non-transitory computer-readable medium of claim 18, wherein a size of each group of vectors of the plurality of vectors to be accessed in parallel is determined by a ratio of total bandwidth of the plurality of channels, and a product of a total number of PEs of the plurality of PEs and a computational precision.

22. The non-transitory computer-readable medium of claim 18 having stored thereon computer-executable instructions for further causing the vector processor to write the plurality of vectors into the vector register file based on a placement table entry of a plurality of placement table entries of a programmable placement table corresponding to a loop;
wherein each placement table entry of the plurality of placement table entries comprises a loop identifier representing the loop, a PE indicator representing a number of PEs for processing the loop, and a computational precision indicator for processing the loop.

23. The non-transitory computer-readable medium of claim 22 having stored thereon computer-executable instructions for further causing the vector processor to:
read a plurality of vector elements of each vector of the group of vectors from the vector register file based on the programmable placement table; and
provide the plurality of vector elements to the plurality of PEs for processing of the loop.

24. The non-transitory computer-readable medium of claim 22 having stored thereon computer-executable instructions for further causing the vector processor to:
receive execution results from the plurality of PEs; and
write the execution results to the vector register file based on the programmable placement table.

* * * * *